Feb. 3, 1953  W. S. WHITING, JR  2,627,339
CONVEYER

Filed May 2, 1950  2 SHEETS—SHEET 1

INVENTOR
William S. Whiting, Jr.
BY Watson, Cole, Grindle
& Watson
ATTORNEYS

Feb. 3, 1953 W. S. WHITING, JR 2,627,339
CONVEYER
Filed May 2, 1950 2 SHEETS—SHEET 2
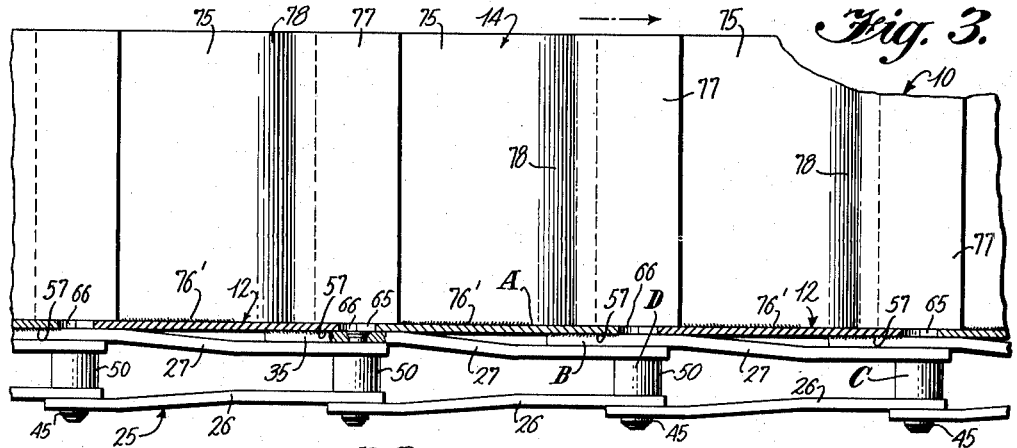
Fig. 3.
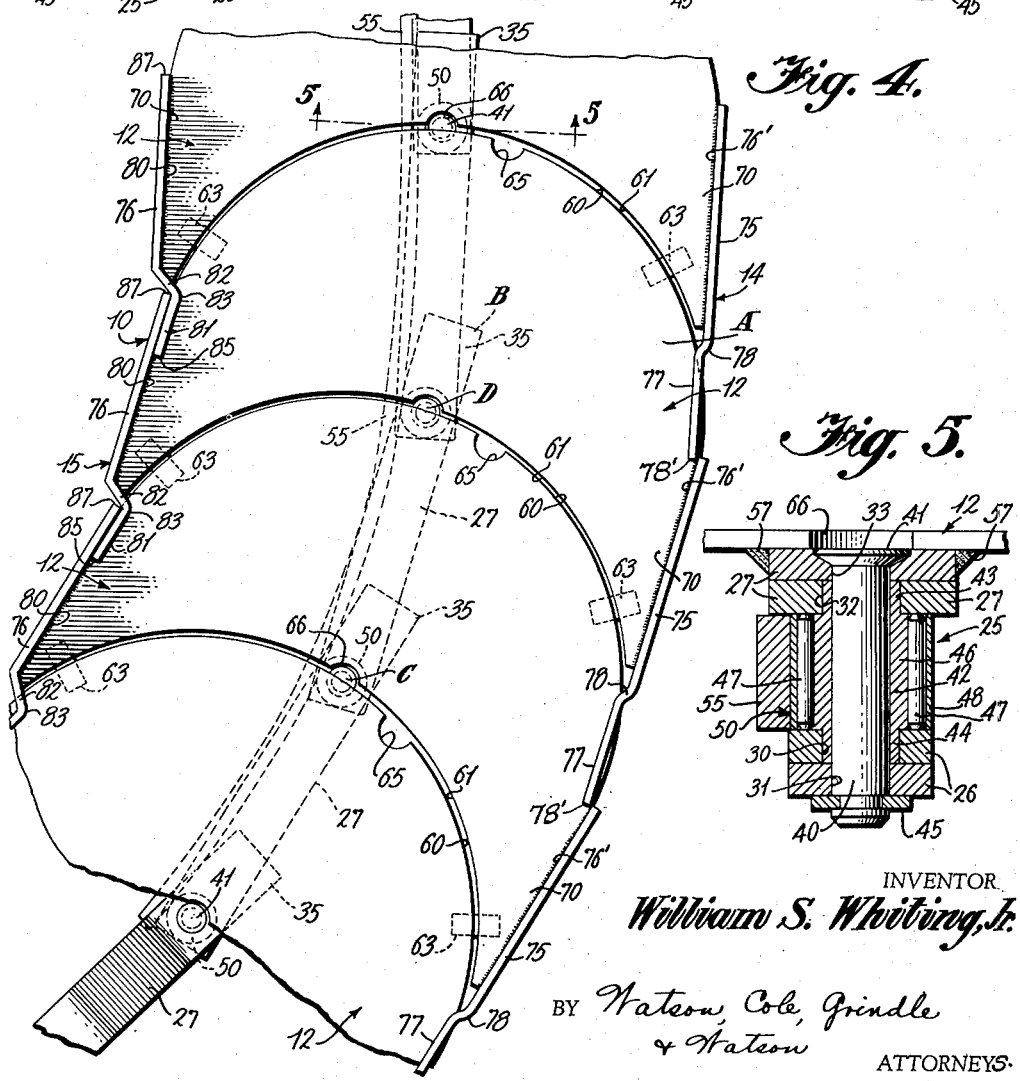
Fig. 4.
Fig. 5.
INVENTOR.
William S. Whiting, Jr.
BY Watson, Cole, Grindle
& Watson
ATTORNEYS.

Patented Feb. 3, 1953

2,627,339

UNITED STATES PATENT OFFICE 2,627,339

CONVEYER

William S. Whiting, Jr., Camden, S. C.

Application May 2, 1950, Serial No. 159,489

2 Claims. (Cl. 198—181)

This invention relates to conveyors and more particularly to power-driven conveyors of the endless type which are adapted to traverse a circuit in a single horizontal plane, the load-bearing portion of the conveyor being articulated so as to make turns of rather short radius. Such conveyors find ready use in many arts, wherein either individual articles or bulk material are to be transported; and, although the embodiment of the invention illustrated and described herein is designed to provide a yarn conveyor for spooler machines in the textile industry, its utility is in no wise limited thereto.

The general object of the invention is to provide a novel and improved conveyor of the class described.

The invention, in its preferred embodiment, contemplates the provision of an endless belt conveyor which not only affords a substantially continuous horizontal carrying surface but which also provides its own side wall structure. Many prior proposals have envisioned the use of articulated bottom plates but have guided the conveyor flights between stationary walls along the conveyor orbit, against which walls the transported goods, material, or articles must rub or scrape in their passage. In the case of some more durable articles such as cans, bottles or the like, this is of little moment. However, in the case of more frangible articles, or of textile material, it can be readily seen that such friction of the conveyed material against the walls past which they are moved can be very undesirable if not positively damaging to the conveyor system or to the goods themselves. The invention therefore provides a conveyor, the flights of which together provide a unitary side wall structure which is articulated in a novel way to provide continuous substantially impervious walls which travel with the conveyor itself and thus require little or no relative movement between the load and the walls.

Other objects and features of novelty, including improved conveyor chain construction, guide roller and track installation, and chain and flight connections, will be apparent from the following specification when read in connection with the accompanying drawings in which one embodiment of the invention is illustrated merely by way of example.

In the drawings:

Figure 3 is a longitudinal sectional view taken on line 3—3 of Figure 2;

Figure 4 is a fragmentary plan view of a portion of the conveyor as it appears when passing around a curve; and Figure 5 is a transverse fragmentary vertical sectional view taken on line 5—5 of Figure 4.

Figure 1:
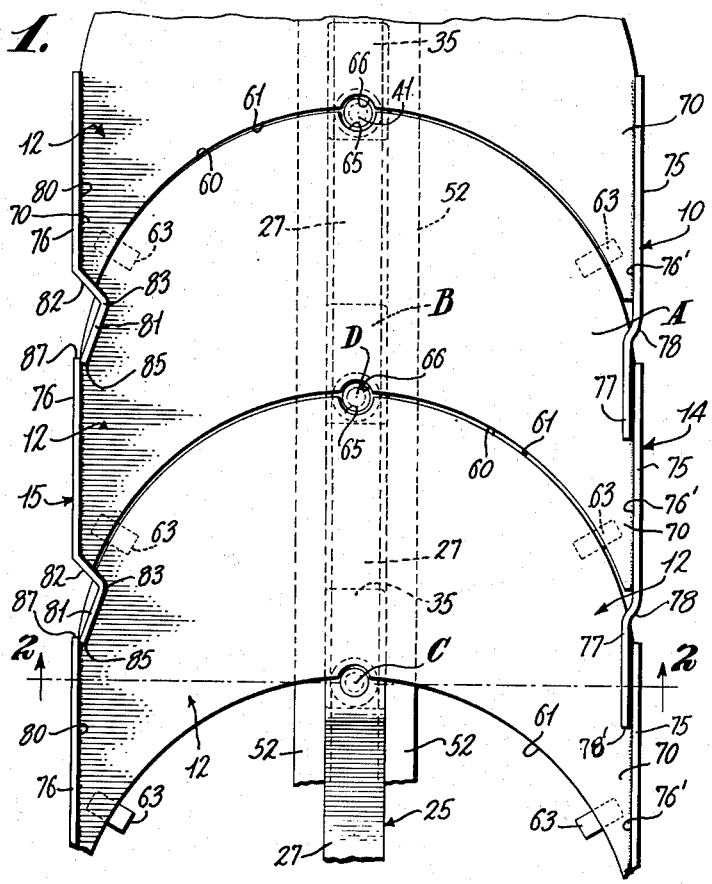
Figure 1 is a fragmentary plan view of a conveyor embodying the principles of the invention.

The novel conveyor illustrated in the drawings is designated generally by the reference numeral 10 and comprises a substantially horizontal articulated load-carrying surface which, except for certain minor clearance spaces between the relatively movable flights which go to make up this surface, is substantially solid and imperforate. The several flights of which the load-carrying surface is composed are designated broadly by the reference numeral 12 and, as clearly shown in Figures 1 and 4 of the drawings, are substantially crescent shaped, departing only from a true crescent in that the side edges of the flights are parallel instead of conforming to the arcuate configuration of the rear edge. Articulated side walls are provided for the conveyor upon each side edge of the load-carrying surface and these walls are indicated generally by the reference numerals 14 and 15, the side walls 14 and 15 being carried along with the conveyor and thus avoiding relative movement between the load and the walls. The conveyor illustrated and described herein is adapted to turn in one direction only around a curved orbit and the side wall 14 is adapted for the outside of such a turn and the side wall 15 for the inside thereof. The peculiar construction of each wall for accomplishing this purpose will be described later.

The movable part of the conveyor is supported upon a framework 17 and the load supporting surface provided by the flights 12 may be sustained, at least along the straightaway portions of the orbit, by the rollers 18 carried by the brackets 19 secured to the horizontal elements 20 of the supporting framework 17.

For the purpose of drawing the conveyor 10 along its orbit and confining it properly thereto, the conveyor chain designated generally by the reference numeral 25 is provided. The construction and arrangement of this chain 25 will be best understood from an inspection of Figures 3 and 5 of the drawings. The chain comprises generally a system of aligned overlapping and pivotally connected lower link elements 26 and a spaced series of upwardly disposed overlapping pivotally connected link elements 27. The lower link elements comprise strap-like bars of equal length and uniform pivoting, the forward and rear end portions of each link element being offset by approximately the thickness of the element and having an inclined intermediate portion connecting the two flat end portions. The overlapping ends of the link elements 26 are provided with registering openings designated respectively by the reference numerals 30 and 31, the opening 30 being of slightly larger diameter than the rearward opening 31. These openings 30 and 31 are disposed preferably at equal distances from the respective ends of the links 26.

The upper links 27 are somewhat differently formed, although they, too, are provided with offset forward and rear ends to provide for the overlap of the successive links. The forward ends of the links 27 are provided with openings 32 of the same diameter as the openings 30 in the lower links and registering therewith. The trailing end of each upper link 27 is provided with a corresponding opening 33 of generally the same diameter as the openings 31 in the trailing ends of the lower links 26. However, the trailing ends of the upper links 27 are extended rearwardly for a considerable distance beyond the pivot opening to form a rearwardly offset extension 35.

Figure 2:
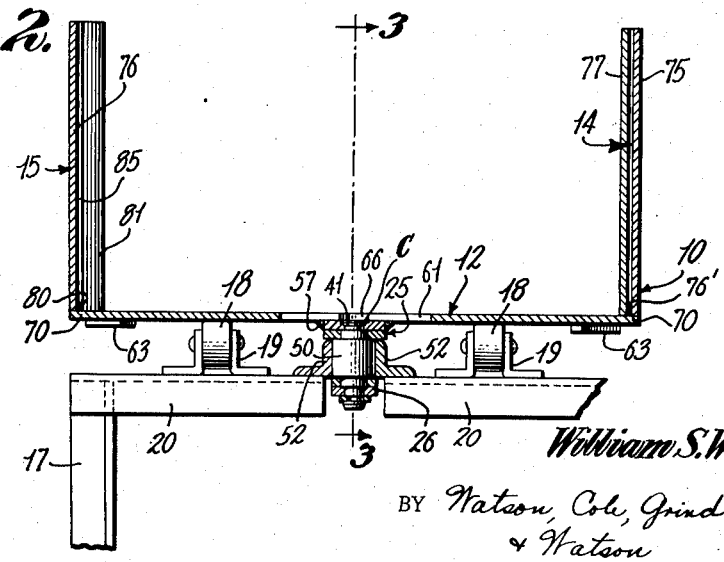
Figure 2 is a vertical transverse sectional view of the conveyor taken on line 2—2 of Figure 1.

As most clearly shown in Figures 2 and 5 of the drawings the registering openings 30, 31, 32 and 33 of the two systems of the links are adapted to surround the pivoting and guiding assembly forming the hinging or pintle portion of the chain. This assembly includes the pivot pin 40 which may be provided with a rivet-like head 41 received within the opening 33 which may, if desired, be countersunk for that purpose. The pivot pin 40 passes downwardly through a hardened bushing 42 which has narrowed shouldered portions 43 and 44 at the ends thereof received within the openings 30 and 32 of the links 26 and 27. The lower end of the pin 40 itself passes through the link opening 31 and may be provided with a cotter element or retainer 45 in a well-known manner.

An intermediate enlarged portion 46 is provided on the bushing 40 and this serves the purpose of providing an inner race for the roller bearings 47, the outer race of which is indicated at 48. This anti-friction bearing assembly provides a roller element for contacting portions of a track for guiding the conveyor and may be designated generally by the reference numeral 50. The rollers 50, along the straight portions of the track may be guided by the angle strips 52 as clearly shown in Figure 2 of the drawings. However, on the curves, there is provided an inner track or rail 55 against which the roller 50 is adapted to bear, this rail being of such a height as not to interfere with the angling of the links 26 and 27 as the chain passes around the curve.

The several crescent-like flights 12 are rigidly secured to the rearward extensions 35 of the successive upper links 27, preferably by welding as indicated at 57, and this is the sole fixed connection of the several flights upon the conveyor chain. Each of the flights 12 has an arcuate rear edge 60 and an arcuate forward edge 61, these arcs preferably being circular arcs and each one centered upon the pivot pin 40 of the joint or pintle of the chain next preceding the pintle pin which is closest to the extension 35 to which the particular flight is welded. Thus, from an inspection of Figures 1, 3 and 4, it will be seen that the flight marked A is rigidly secured to the link extension marked B and it is arranged for pivotal movement about the pintle center marked C which is the one next ahead of the adjacent pintle designated D. This arrangement prevails throughout the length of the conveyor as will be clearly seen from Figure 4 of the drawings. Thus it will be seen that each flight as it passes around the curve has an arcuate movement with respect to the next adjacent flight and the respective rear and forward edges 60 and 61 slide accordingly. To maintain the proper alignment of these edges 60 and 61, tabs or lips 63 are provided, these elements 63 being preferably welded to the side or cusp portions of the forward edges 61 and adapted to underlie and support the rearward edges 60 of the adjacent flights. Conveniently, the edges 60 and 61 are cut away as at 65 and 66 to provide access to the pins 40, in order to repair or dismantle the conveyor chain.

Each flight 12 departs slightly from the true crescent shape by the provision of straight parallel side edges as at 70. The articulated side wall assemblies 14 and 15 comprise separate relatively movable elements or sections 75 and 76, the element 75 being rigidly secured to the straight side edges 70 of the flights as by welding as at 76'. The rearward portion of each of the elements 75 is contiguous with the side edge 70 of a flight and has a forward extension 77 which has an intermediate offset 78 therein to enable the successive sections 75 to overlap snugly during passage along straight portions of the track as indicated in Figure 1. This side wall 14 is adjacent the outer side of the turn and during the turn there is relative movement between the forward and rear edges of the section 75, the extension 77 of one section 75 moving rearwardly with respect to the preceding section with the forward edge 78' moving along the inner surface of the preceding section 75 and maintaining rather snug contact therewith up to the limit of relative movement indicated in Figure 4, and thus providing a continuous articulated outer side wall.

The inner side wall 15 is of somewhat different construction in order to allow for the necessary angling and telescoping of the sections 76 while taking a turn. Each inner section 76 is welded to the straight side margin 70 of the flight 12 as at 80 and its forward extension 81 is of peculiar configuration comprising a rather sharply angled portion 82 directed inwardly toward the center line of the conveyor, and then another fairly sharply angled bend 83 causing the extension 81 to flare outwardly again toward its forward edge. The result of this conformation is readily apparent from Figures 1 and 4. During straight travel, the forward edge 85 of the extension 81 rests against the inner surface of the next preceding section 76 adjacent the extreme rear edge thereof with the outer portion of the extension 81 following the curvature of the arcuate rear edge 60 of the preceding flight. When rounding a curve, the successive elements 76 telescope, the rear edge 87 of the leading section 76 moving rearwardly with respect to the following section 76 and moving into the angle 83 as the maximum curvature is approached, this being clearly shown in Figure 4 of the drawings.

Various changes and modifications may be made in the embodiment illustrated and described herein without departing from the scope of the invention as defined by the following claims.

Having thus described the invention, what is claimed as new and desired to be secured by Letters Patent is:

1. In an endless belt conveyor of the type adapted to negotiate a turn in the horizontal plane of the load carrying surface in one direction of turning only, in combination, a conveyor chain, a series of approximately crescent-shaped conveyor flights carried by said chain and articulated for cooperation during movement of the conveyor about a horizontal turn to provide a substantially continuous uninterrupted load carrying surface, each of said flights comprising a plate having straight parallel side edges and circular-arc forward and rear edges, the respective forward and rear edges of adjacent flights having relative pivotal movement about the center of said arcuate edges, articulated side walls for said conveyor comprising separate sections each carried by one of the straight parallel side edges of the respective flights and having portions extending beyond the said edges into overlapping relationship with the side wall section of the next adjacent flight, the extended portions of the side walls on the inside of the turn overlapping the inner surface of the next adjacent side wall and being provided with an angular inward bend providing a recess in the outer wall of the extension to accommodate the angled edge of said next adjacent wall section when the sections are telescoped on a turn.

2. An interconnected articulated flight system for endless belt conveyors of the type capable of making a turn in one direction only in the horizontal plane of its load carrying surface comprising, in combination, a series of somewhat crescent-shaped plate-like flight elements having straight parallel side edges and circular-arcuate parallel fore and aft edges, the side edges maintaining substantial alignment during straight-away travel and the adjacent arcuate edges shifting arcuately in a horizontal direction about the center of curvature of said arcuate edges relatively to each other during a turn, forwardly projecting portions on each side wall section on the outside of the turn offset approximately the thickness of the wall, parallel with, and overlapping the inner surface of the next adjacent forward section, forwardly projecting portions on each side wall section on the inside of the turn also overlapping the inner surface of its next adjacent forward section but having an angular inward offset therein to form a triangular indentation to accommodate the edge of said next forwardly adjacent wall section as it swings inwardly of the conveyor when the sections are relatively moved during a turn.

WILLIAM S. WHITING, Jr.

REFERENCES CITED

The following references are of record in the file of this patent:

UNITED STATES PATENTS

| Number | Name | Date |
|---|---|---|
| 580,533 | Reynolds | Apr. 13, 1897 |
| 679,573 | Potter | July 30, 1901 |
| 1,424,850 | Purcell | Aug. 8, 1922 |
| 2,150,610 | Raffetto | Mar. 14, 1939 |

FOREIGN PATENTS

| Number | Country | Date |
|---|---|---|
| 361,022 | Germany | Oct. 9, 1922 |